| United States Patent Office | 3,219,554
Patented Nov. 23, 1965 |
|---|---|

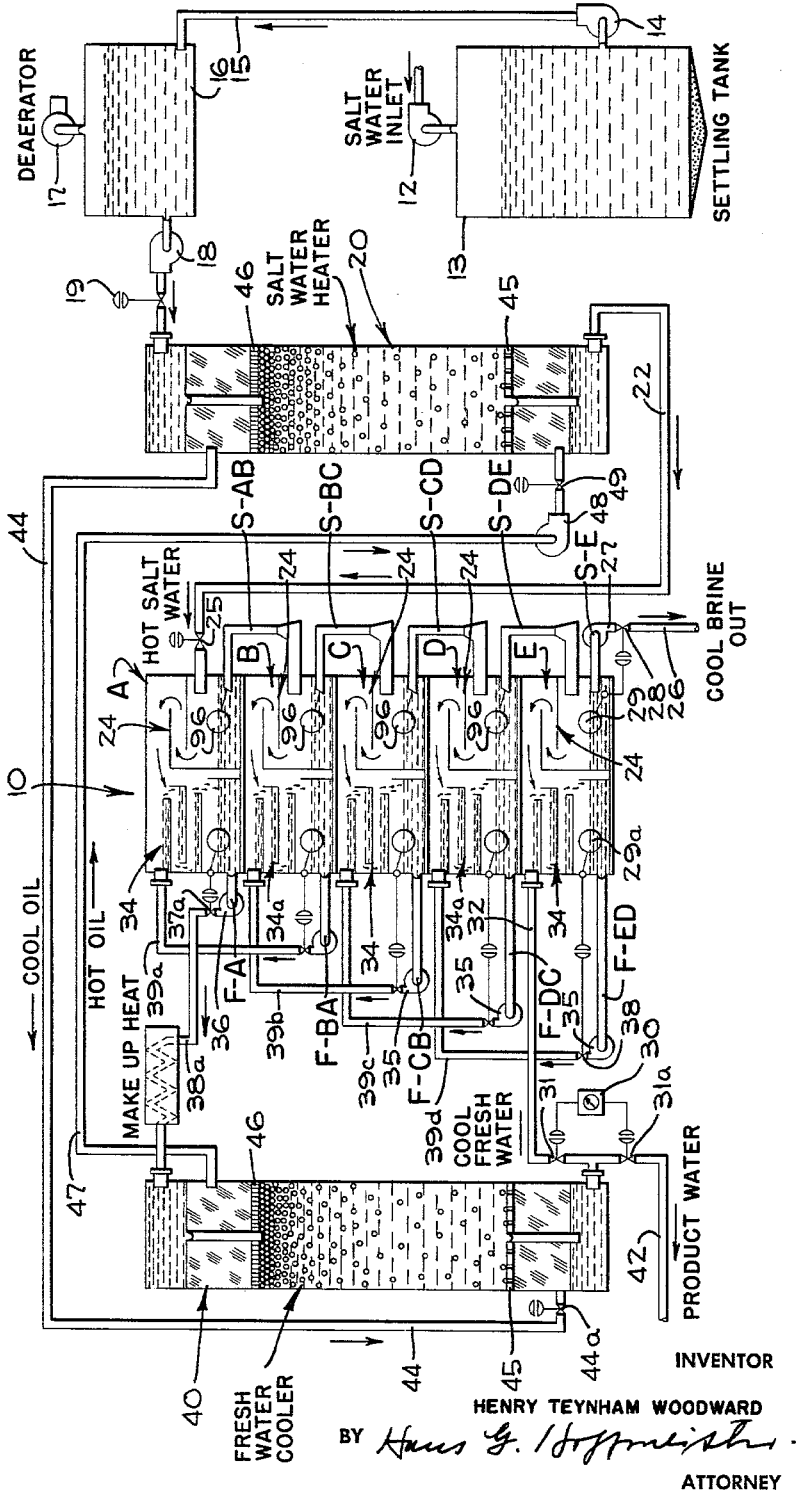

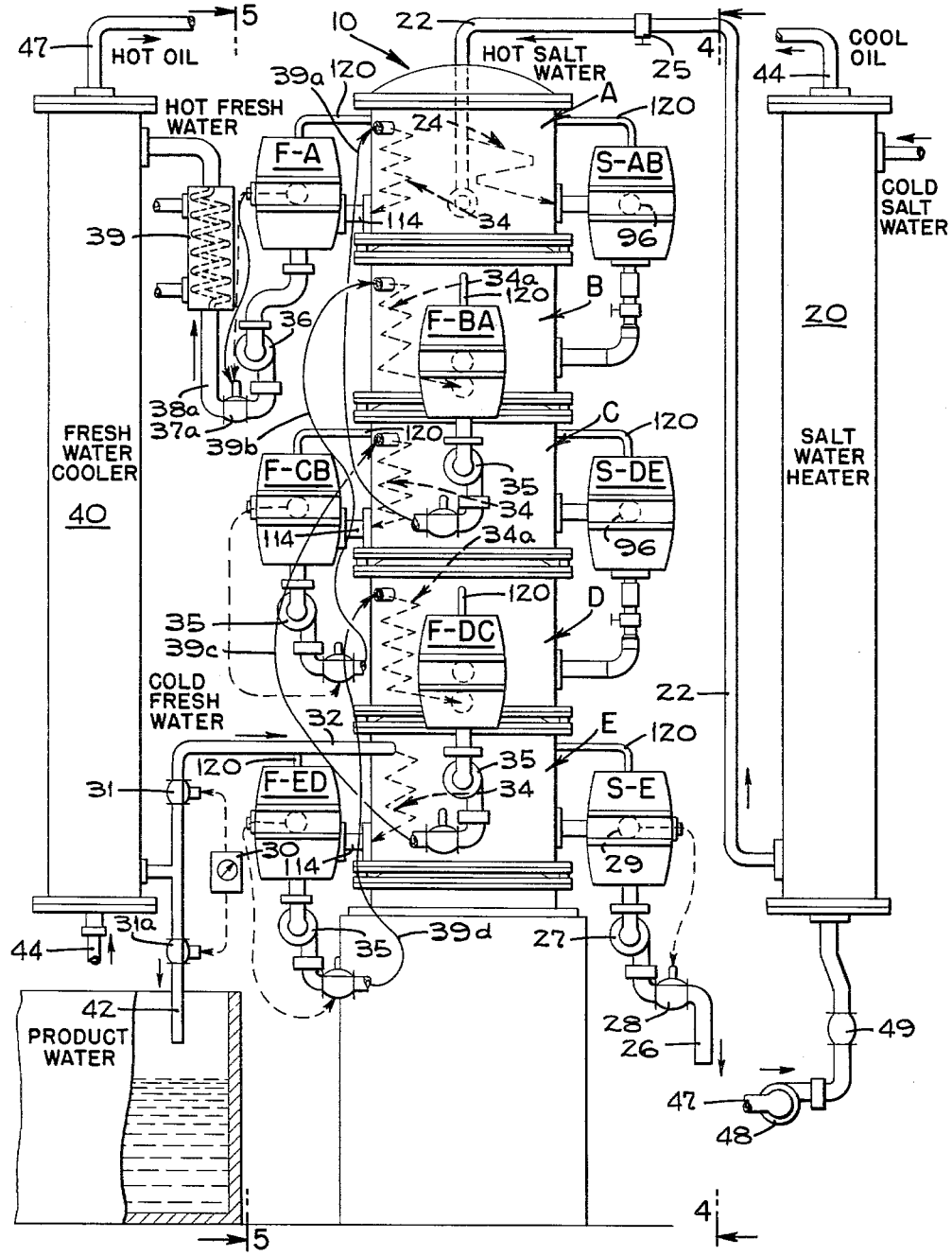
FIG_2

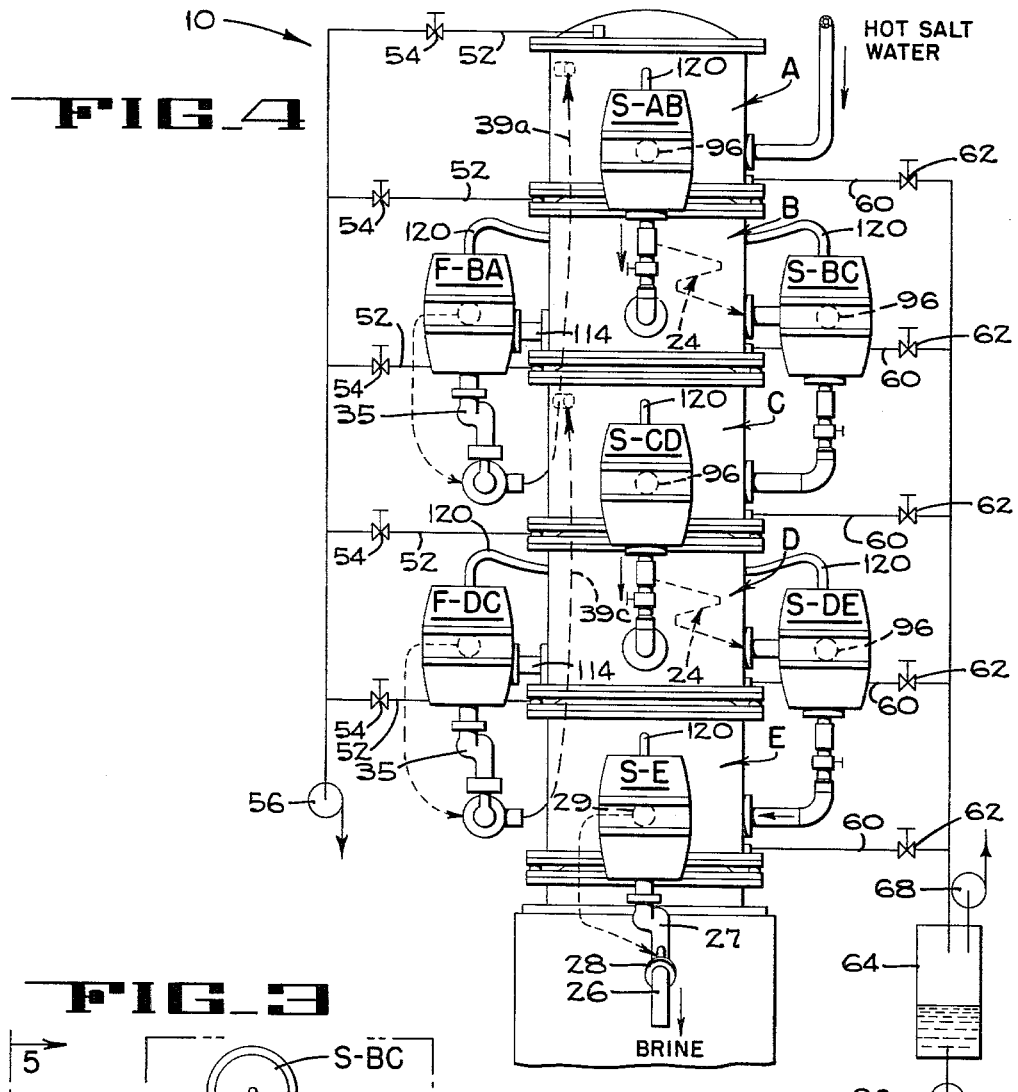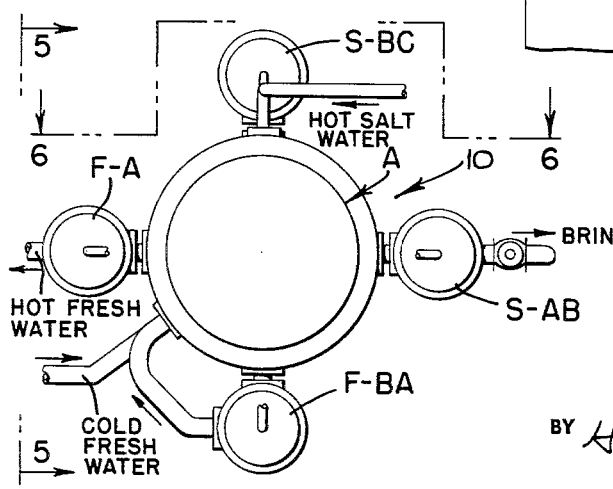

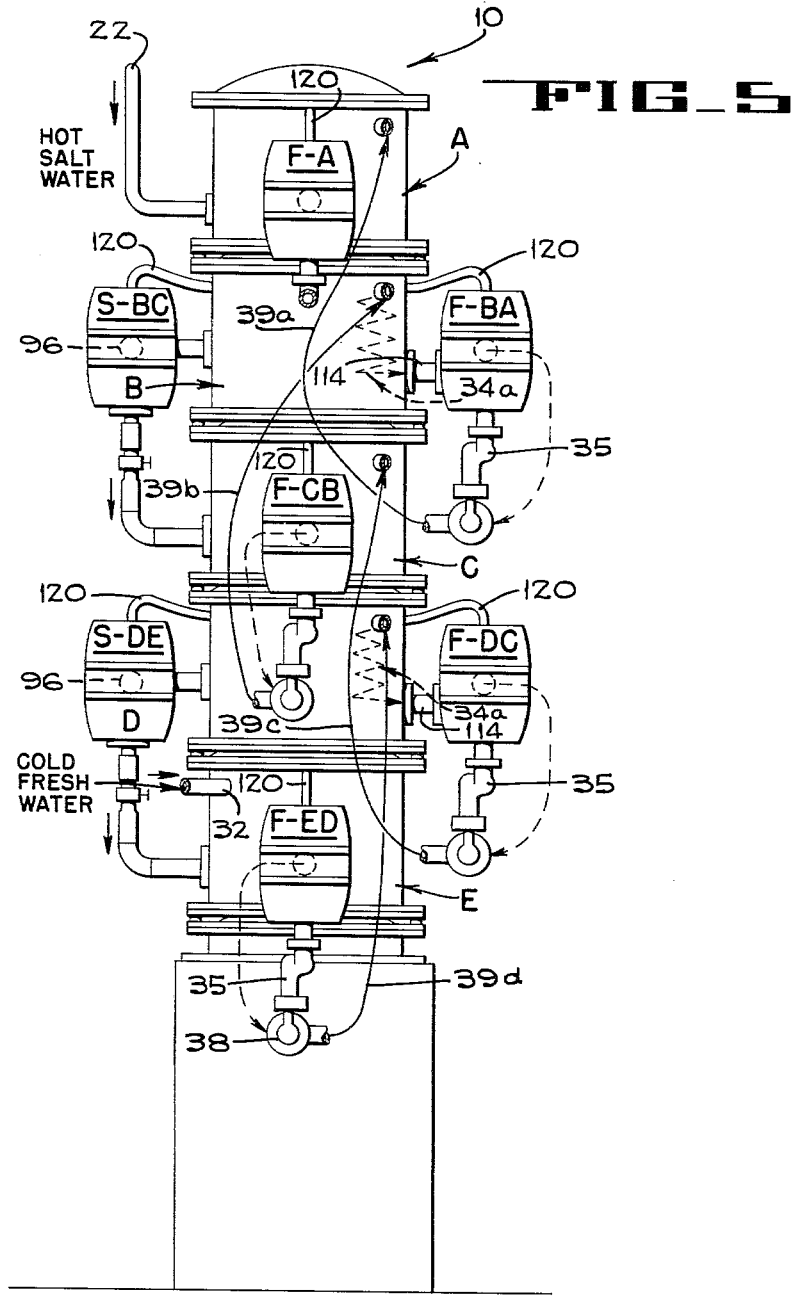

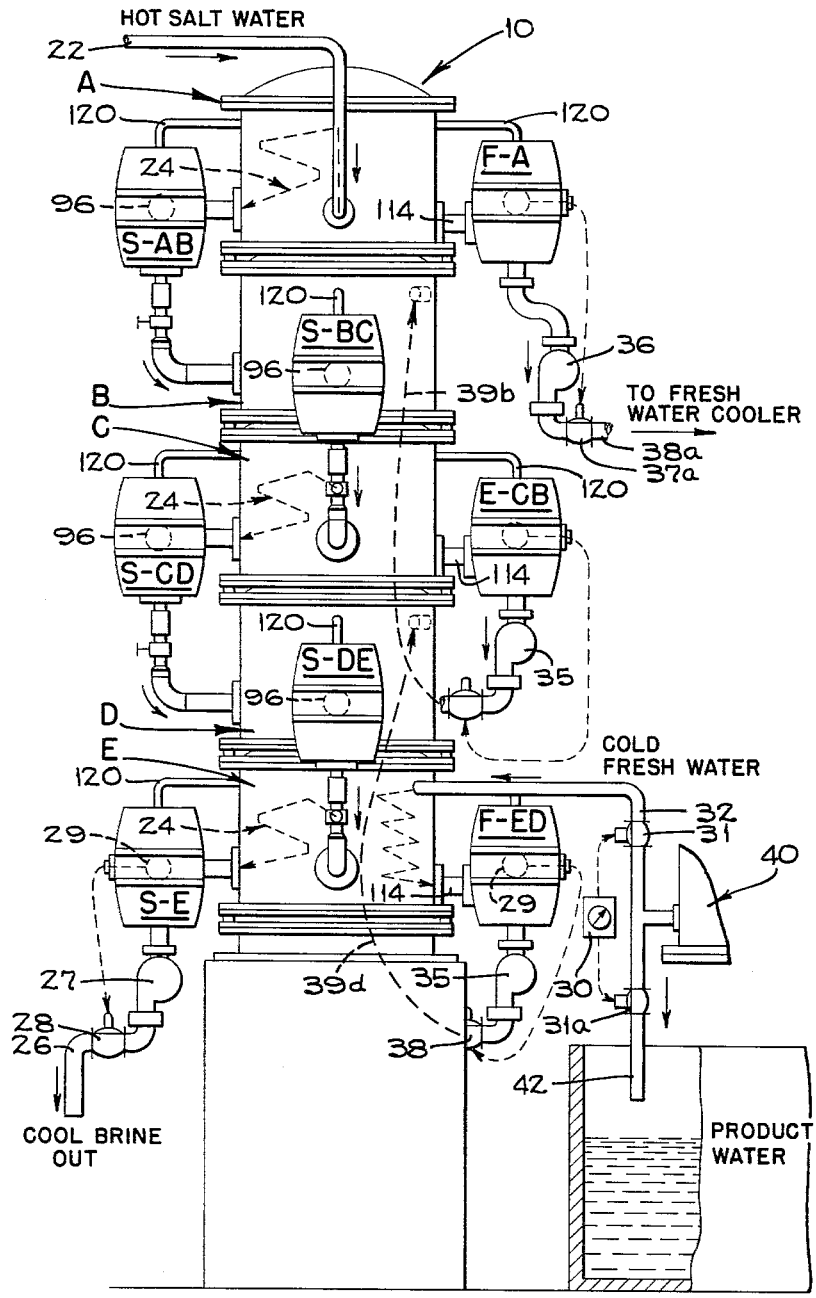
FIG_6

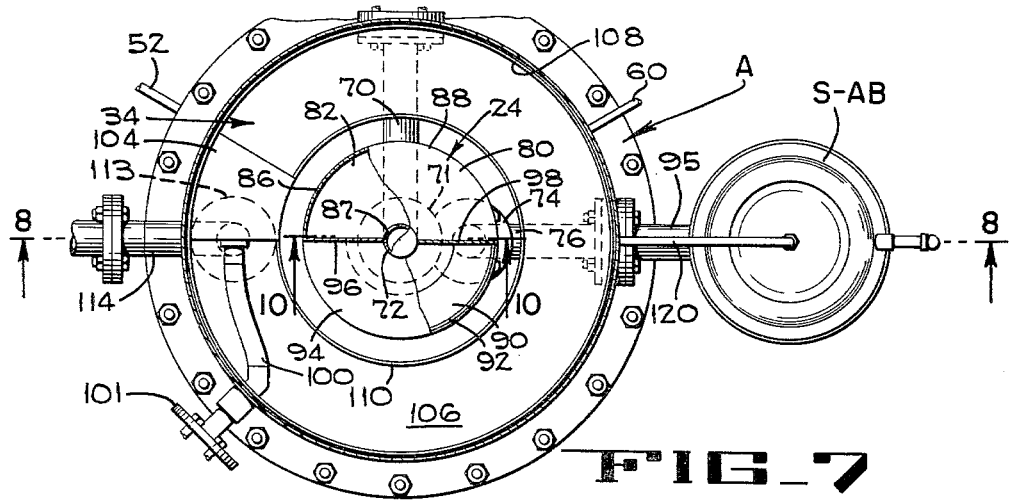
FIG_7
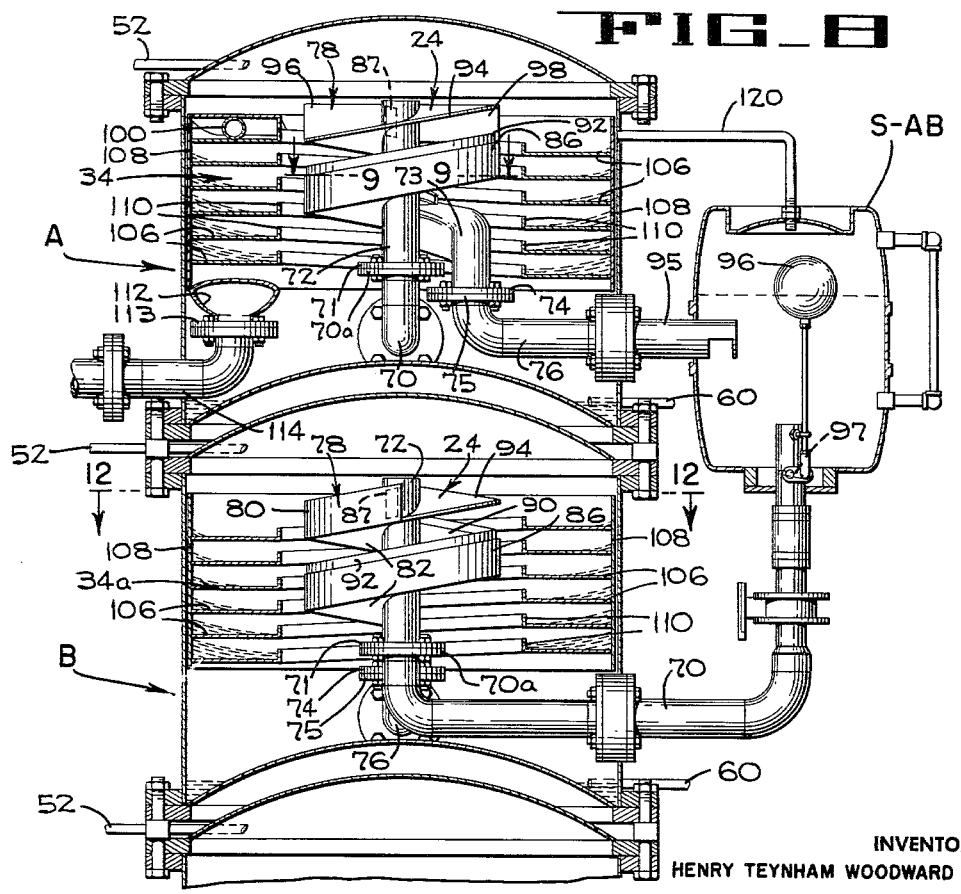
FIG_8

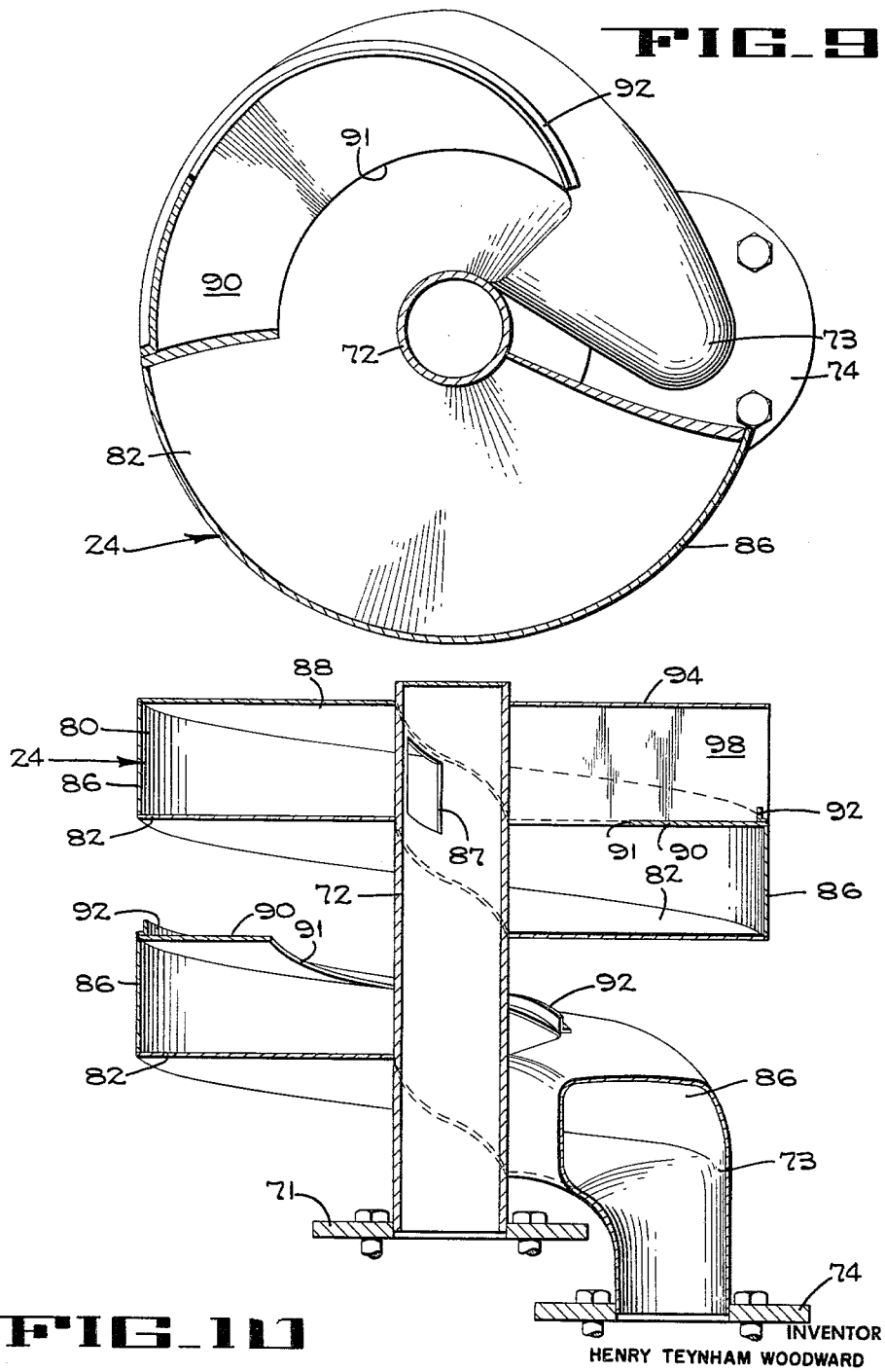

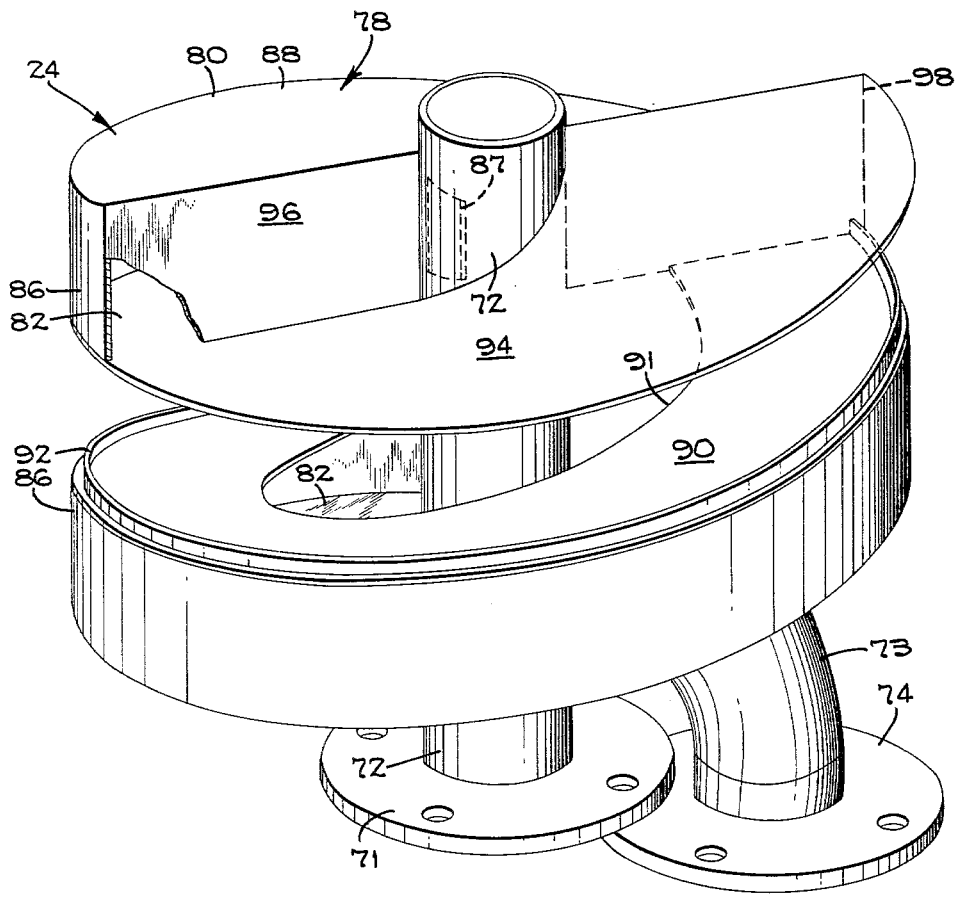
FIG_11

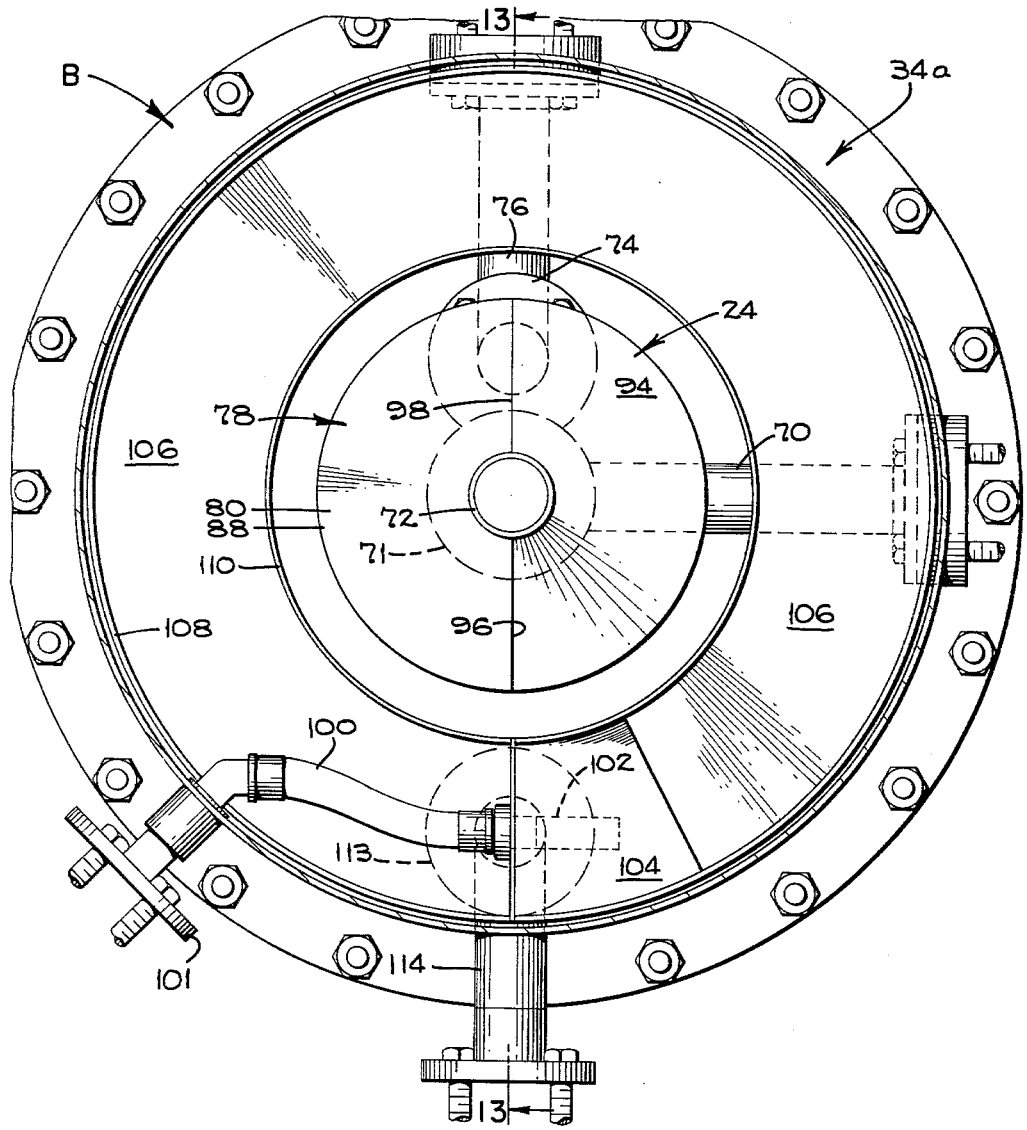
FIG_12

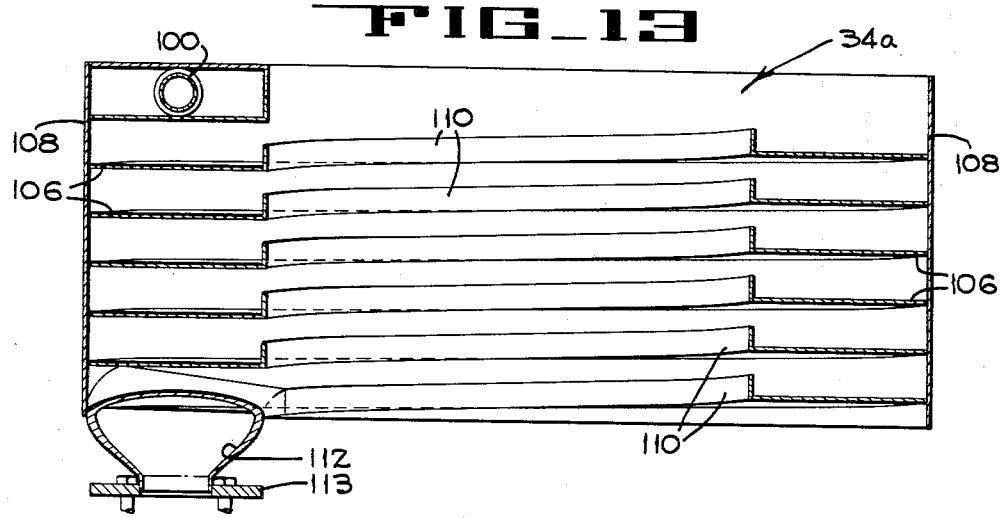
FIG_13
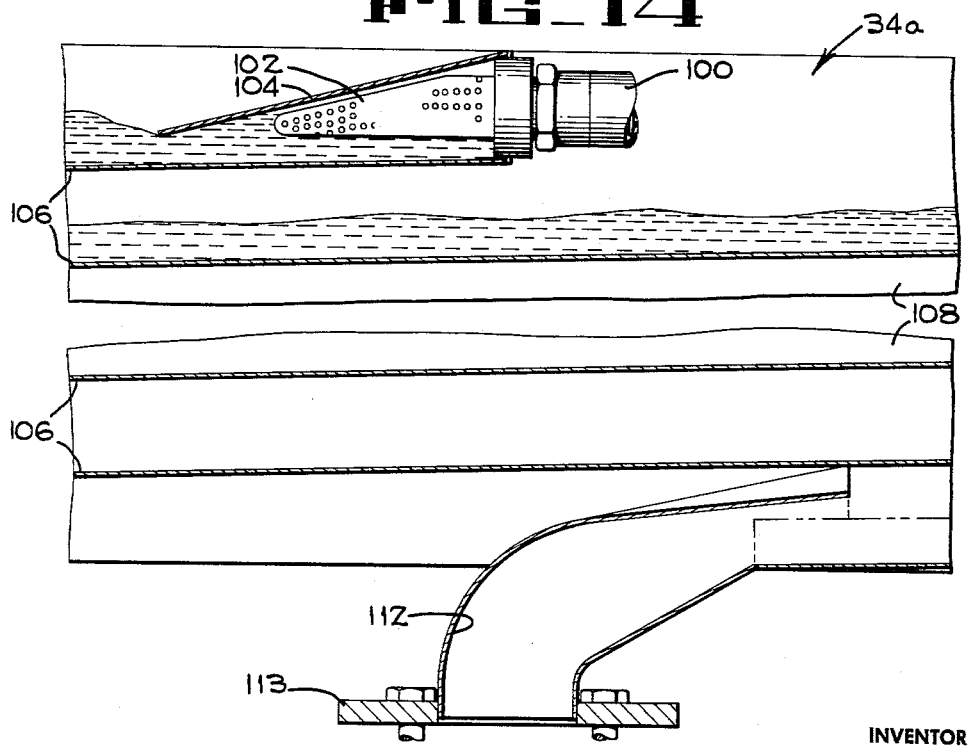
FIG_14

3,219,554
FLASH DISTILLATION APPARATUS WITH DIRECT CONTACT HEAT EXCHANGE
Henry T. Woodward, Los Altos, Calif., assignor to FMC Corporation, San Jose, Calif., a corporation of Delaware
Filed Nov. 7, 1962, Ser. No. 236,098
4 Claims. (Cl. 202—173)

This invention relates to a method and apparatus for flash distillation. The embodiment of the invention to be described in detail relates to the distillation of saline water, such as sea water, in order to produce fresh water for home, agricultural, industrial and other uses. The distillation operation of the type to which this invention relates is referred to as a flash distillation process, and to attain thermodynamic efficiency such distillation is carried out in a plurality of stages, or effects.

In such processes, the heat of vaporization is applied to the sea water or other solution being distilled externally of the still proper, and evaporation does not take place during application of the heat to the solution. The hot solution, such as saline water, is introduced into each still chamber at a temperature above the dew point temperature at the vapor pressure within the chamber. Fresh water is introduced into each chamber of the still at a temperature somewhat lower than the corresponding dew point temperature. Air and non-condensible gases are evacuated from the still chambers, and so do not hinder evaporation and condensation. Due to the temperature difference between the saline water and the fresh water streams in each chamber of the still, water vapor flashes from the saline water stream and condenses into the somewhat cooler fresh water stream, as both streams flow through the still. The weight of water vapor thus condensed represents an increase in the fresh water in the system, and hence can be considered to represent the product water produced by the still. Systems of this type are particularly useful in connection with the distillation of saline or sea water, because scale problems are reduced or minimized. However, prior systems of this type have not been completely satisfactory.

For example, it has been proposed to employ spray nozzles for introducing the sea and fresh water streams into the evaporator and condenser portions of the still, respectively. Such a system has been found to provide virtually insurmountable difficulties because under high flow service conditions, the spray nozzles clog repeatedly and continuously.

A system that shows more promise, but which also has drawbacks, is one in which the salt and fresh water inputs to the evaporator and condenser sections of the stills are in the form of freely falling, unconfined streams of water. The water vapor flashes from the falling stream of sea water, and is condensed into the parallel falling stream of fresh water. This system required a complicated system of louvres between the free falling streams of water, to prevent carry-over of salt water into the fresh water. However, despite the provision of such louvres, which represent a costly expedient in large scale installations, the co-mingling of the salt with the fresh water has been found to produce an unacceptably high salt content in the product fresh water.

It is an object of the present invention to obtain the advantages of the flash or open type still without encountering the disadvantage incident to the use of spray nozzles, and without providing an unacceptably large carry-over of the salt water into the fresh water. Briefly, and in accordance with the present invention, both the salt and the fresh water are introduced into the still at the upper end of conduit means which confine the water streams, but provide for vapor transfer. The streams of water flow by gravity, while confined by their respective conduit means, from the upper to the lower portion of each still chamber, and a simple baffle structure at the salt water evaporator has been found adequate to prevent unacceptable carry-over of salt water to the fresh water.

Another object is to provide a still of the type described which is of simple and inexpensive construction. Salt water conversion installations for urban and agricultural areas are necessarily large, so that capital cost considerations are of the utmost economic importance.

Another object is to facilitate the flash distillation process and thereby to increase the amount of water distilled or flashed over in a given stage of the system. This is accomplished by introducing a mild or gentle turbulence to the streams of water as they flow downwardly through the still. Such turbulence is introduced by making the still of the nested helix type. In the present invention, the salt water is introduced into the upper end of a coarse helix, which is baffled to prevent drops of salt water from leaving the helix. This helix is nested within and spaced from an outer helix which receives the fresh water. The space between the two helices, coupled with the baffle at the salt water helix, accommodates free passage of water vapor to the fresh water stream, and provides an acceptably low carry over of salt water into the fresh water.

Another object of the invention is to take advantage of the action of centrifugal force on a stream of water that is constantly changing direction, to reduce carry over of salt water into the fresh water. This phenomenon takes place in the nested helix type still of the present invention, wherein the action of the centrifugal force tends to crowd the water against the radially outer wall of each helix. For reasons not completely understood this action has been found to reduce the carry over of salt water into the stream of fresh water to a very low figure, a figure heretofore unattainable in flash type installations.

Still another object of the preferred embodiment of the invention is to eliminate the necessity for a large number of downcomers between water confining pans or conduits in the still. Such downcomers are unnecessary in the nested helix type of apparatus of the present invention.

The manner in which these and other objects and advantages are attainable will be apparent from the following detailed description of an embodiment of the invention.

In the drawings:
FIGURE 1 is a diagram of a system embodying the present invention for the conversion of sea water to fresh water.
FIGURE 2 is a front elevation of the still and associated equipment.
FIGURE 3 is a plan of the still.
FIGURE 4 is a side elevation of the still, as indicated at 4—4 on FIGURE 2.

FIGURE 5 is an elevation of the other side of the still, as indicated at 5—5 on FIGURES 2 and 3.

FIGURE 6 is a rear elevation of the still, as indicated at 6—6 on FIGURE 3.

FIGURE 7 is a plan of the still with the top of the upper chamber removed.

FIGURE 8 is a fragmentary section of the still taken on line 8—8 of FIGURE 7.

FIGURE 9 is a section of a boiler, taken on lines 9—9 of FIGURE 8.

FIGURE 10 is a vertical section through a boiler, taken on lines 10—10 of FIGURE 7.

FIGURE 11 is a perspective of one of the boilers.

FIGURE 12 is a horizontal section through the second chamber of the still, taken on lines 12—12 of FIGURE 8.

FIGURE 13 is a section through a condenser, taken on lines 13—13 of FIGURE 12.

FIGURE 14 is a fragmentary developed section of a condenser.

*General description of the apparatus*

FIGURE 1 is a schematic diagram showing a saline water conversion system embodying the invention. This diagram shows the still, including the evaporator and condenser parts, in simplified form, in order to facilitate description of the principles of operation. FIGURES 2–6 are external views of an installation embodying the invention.

Referring primarily to FIGURE 1, and to FIGURES 2–6 as required, the over-all operation of a system embodying the invention will be described. The apparatus described is a unit for converting sea water into fresh water. The still is indicated generally at 10, and is a multiple stage or multiple effect device. In the apparatus being described, five stages or pressure chambers A, B, C, D and E make up the still proper. Cool sea (saline) water is introduced into the system by a pump 12, which pumps the sea water into a settling tank 13. A pump 14 delivers the cool sea water through a line 15, from the settling tank to a deaerator 16. Connected to the top of the deaerator is a vacuum pump 17, which removes air and other noncondensible gases entrained in the sea water, before the sea water continues through the distillation system. The sea water is pumped from the deaerator by a pump 18, through a flow control valve 19, and into a salt water heater 20. The salt water heater 20 is a liquid to liquid heat exchanger of the type disclosed and claimed in the application of Woodward et al., Serial No. 84,652, filed January 24, 1961, and assigned to the assignee of the present application.

The heated sea water leaves the salt water heater 20 through a line 22, which delivers the hot sea water to a helical flash boiler or evaporator 24, in the uppermost section A of the still. Details of the construction of the flash boiler or evaporator 24 will be explained after this description of the over-all operation of the system has been completed. In FIGURE 1, the flash boiler is shown in highly diagrammatic form. An adjustable flow control valve 25 in the line 22 determines the rate of entry of hot sea water to the still 10. A float valve controlled unit S-AB, conducts the partially distilled sea water by gravity from the evaporator 24 of section A to an identical evaporator in section B of the still. Similar float controlled, inter-connecting units S-BC, S-CD and S-DE carry the salt water from chamber to chamber of the still. The concentrated sea water or brine is pumped out of a discharge line 26 from the last and lowermost chamber E, through the final float controlled unit S-E, by a pump 27. The discharge of the pump 27 is controlled by a servo-operated valve 28, and float 29 in the float chamber S-E of the last stage E (see FIG. 2). This prevents the pump 28 from running dry. The float controlled valve 28 and other float control valves employed in the system are of conventional design, commercially available on the market, and the details thereof do not form part of the present invention. When the brine is discharged from the evaporator 24 of the last stage E, it will be substantially at atmospheric temperature, so that heat losses are reduced to a minimum.

The flow of fresh water through the system will now be traced. A proportioning control unit 30 operates proportioning valves 31 and 31a, so that a selected quantity of cool, fresh water enters the last stage E of the still, through a fresh water inlet line 32. Proportional control devices of this type are standard items of manufacture, and details thereof do not form part of the present invention. A suitable device is manufactured by the Taylor Instrument Company of Rochester, N.Y., as their "Ratio Relay," model 391 RF.

A helical vapor condenser 34 is provided in each of the chambers A, C and E of the still, and a helical condenser 34a, on the other hand, is provided in the chambers B and D. The cool fresh water enters the upper portion of the helical condenser 34 in the last chamber or stage E, and flows downwardly through the condenser by gravity. The details of the construction of the condensers will be described, after this general description of the operation of the unit has been completed. The showing of the condensers in FIGURE 1 is highly diagrammatic. The fresh water leaving chamber E will have been heated by the heat absorbed in condensing the water vapor in the last stage E. The partially heated fresh water is withdrawn from the discharge pipe of the condenser 34 by a pump 35. The discharge of this pump is controlled by a float controlled servo-mechanism F-ED, including a float 29a which functions like the unit S-E just described. Unit F-ED operates a flow control valve 38. The fresh water pump 35 connected to unit F-ED forces the partially heated fresh water upwardly through a line 39d from stage E into the upper portion of the condenser 34a in the next to the last chamber D. Here the process is repeated, and fresh water that has been further heated by vapor condensation is discharged from chamber D and introduced into the upper portion of the condenser 34 in chamber C, through float controlled mechanism F-DC, and line 39c. Similar devices F-CB and F-BA and associated pumps 35 transfer fresh water from the chamber C to chamber B, and from chamber B to the first, or uppermost chamber A. The fresh water becomes progressively hotter as it flows through each chamber of the still. Thus it can be seen that both the salt and the fresh water streams flow in the same direction through each still chamber, but flow countercurrently externally of the still. The hot fresh water is withdrawn from the discharge pipe of the condenser 34 of the chamber A by discharge pump 36. The discharge of this pump is controlled by a final flow control valve 37a, and a float control device F-A. The hot fresh water is conducted from valve 37a by a line 38a to a make-up heat exchanger 39, which supplies process heat, and that lost externally through convection, conduction, etc. The hot fresh water leaving the make-up heat exchanger 39 enters the upper portion of a fresh water cooler 40. The latter device is another liquid to liquid heat exchanger, of the type described in the aforesaid Woodward et al. application, and is therefore physically like the salt water heater 20. Cool fresh water leaves the bottom of the fresh water cooler 40, under control of the proportioning device 30, previously referred to. Most of the cool fresh water is returned to the still by means of line 32, as previously described. However, part of the cool fresh water is withdrawn in line 42 to storage, forming the product fresh water. In the system described about 90% of the fresh water is re-circulated in the system, and about 10% of the fresh water is withdrawn in line 42 as product water for an operating range of approximately 100° F., that is, when the salt water enters the still at a temperature that is about 100° higher than when it leaves the still.

Referring to the oil circuit in the heat exchange system, this circuit is like that described in the aforesaid pending application of Woodward et al., and hence will be described only briefly. Cool oil enters the fresh water cooler 40 by means of line 44, under control of valve 44a. The oil is dispersed in the form of discrete droplets by an orifice plate 45. The oil droplets soon pack, and rise as a body through the heat exchange column, abstracting heat from the descending hot fresh water. At the top of the column, the oil droplets are coalesced by a honeycomb member 46 into a homogenous body of oil. This body of oil has been heated by countercurrent contact with the descending fresh water in the column. The hot oil is withdrawn through a line 47 by a pump 48, under control of a valve 49, whereupon the heated oil enters the salt water heater 20. The hot oil is again dispersed into droplets by an orifice plate 45 like that in the unit 40. As before, the droplets of oil rise and pack in the column, thereby heating the descending body of initially cool salt water. At the top of the column, the cooled oil droplets are coalesced by a honeycomb unit 46, like that in the fresh water cooler, and the resultant body of cool oil is withdrawn in the line 44 and returned to the fresh water cooler through valve 44a, for re-circulation.

Thus, with the circuit described, continuous distillation of the sea water is carried out, while requiring a small amount of process, heat plus enough make-up heat to overcome the effects of thermal losses such as conduction of heat to the atmosphere. The losses can be minimized by insulating the various pipes and units of the assembly in the usual manner.

Referring to FIGURES 7 and 8, it can be seen that each flash evaporator 24 is in the form of a central helical member having less than two turns. The condensers 34 and 34a are also in the form of helical members, but these have a larger number of turns. Each condenser surrounds the associated evaporator, and is spaced therefrom.

Since the condensation process carried out in the still of the present invention is a direct contact process, it is necessary that each chamber be freed of non-condensable gases such as air, or the like. In order to remove such gases, a line 52 is connected to the upper portion of each of the chambers A, B, C, D and E. As indicated in FIGURES 4 and 8 the lines 52 are connected to individual flow control valves 54 which all lead to a vacuum pump 56. The valves 54 are adjusted so that the rate of exhaustion of non-condensable gases from each chamber substantially equals the rate of introduction of such gases into the chamber, thus very little water vapor is withdrawn.

Most of the water vapor that flashes over from each evaporator 24 is condensed into the stream of fresh water flowing through the associated condenser. However, some of the water vapor will condense upon the walls or upon external parts of the condensers in each chamber. This water collects in the lower portion or sump of each chamber, and is withdrawn by lines 60 connected to the lower portions of each chamber. Each line 60 is controlled by a flow control valve 62, and as seen in FIGURE 4, the water flows by gravity into a condensate tank 64. A scavenger pump 66 removes the water from the tank 64. A vacuum pump 68 is also connected to the tank, thus providing a low pressure sump into which water will drain by gravity from all chambers, including those under a vacuum, such as the final chamber, or chambers.

The evaporator

Details of the evaporator construction appear in FIGURES 9 to 12, and typical connections are shown in FIGURES 7 and 8. The salt water is introduced into each evaporator 24 by an elbowed inlet pipe 70 (FIGURE 8), which is flanged at 70a in order that it may be bolted in either of two positions to a flange 71 at the lower end of an inlet riser pipe 72. This design provides for staggered mounting of the various salt water float chambers S-AB, S-BC, etc. The outlet of the evaporator is a downcomer 73 (FIGS. 10 and 11) which is provided with a flange 74. Flange 74 can be bolted in selected positions to a flange 75 (FIG. 8) of an elbowed outlet pipe 76, for connection to the associated float chamber. The body of each evaporator 24 is in the form of a coarse helix, indicated generally at 78, and having 1½ turns. This forms a helical gravity conduit for the salt water, as it flows downwardly through each of the still chambers A, B, C, D and E. The first half turn 80 (FIGS. 10 and 11) of the evaporator helix is closed. The entire helix has a bottom wall 82 that extends to the downcomer 73, and terminates in the mounting flange 74, previously described. The helix of the evaporator has an outer side wall 86 that also extends to the downcomer 73. The inner wall of the helix is formed by the riser pipe 72, and as best seen in FIGURE 10, a discharge port 87 is formed in the upper end of the riser pipe 72, for conducting the sea water into the entrance portion of the helix. The first half turn of the helix has its upper portion closed by a top cover plate 88, whereas the upper portion of the last turn of the helix is only partially covered by an upper baffle plate 90. This provides an open passage 91 for the escape of water vapor from the evaporator, and the baffle plate 90 prevents droplets of salt water from being carried out of the evaporator and into the condenser. In order to cause any droplets that fall upon the top of baffle 90 to drain back into the condenser conduit, a flange or lip 92 extends around the periphery of the last turn of the condenser. As best seen in FIGURE 11, the bottom plate 82 of the first half turn of the helix has a continuation 94, which serves as a baffle for the first half turn of the open section of the helix. A vertical plate 96 serves as an end closure for the beginning of the closed portion of the helix, and the continuation 94 of the bottom plate 82 leads to a vertical plate 98 (FIG. 11), which extends downwardly to the beginning of the last full turn of the helix.

As seen in FIGURE 8, the elbowed outlet pipe 76 of the evaporator connects to a lead-in pipe 95, for conducting the sea water from the evaporator into the associated float chamber, this chamber being chamber S-AB in FIGURE 8. Each of the gravity float chambers S-AB, S-BC, S-CD, and S-DE contains a float 96, that controls a butterfly valve 97, which throttles the flow of sea water between the chambers. Thus a water seat is established that makes it possible for each chamber to be at a different equilibrium pressure. Thus the evaporator in each of the still chambers conducts the sea water downwardly through each chamber in a helical path, so that the water is urged by centrifugal force against the outer wall 86 of the helix. This action, coupled with the baffle 90, and flange 92, insures that water vapor can pass from the uncovered portion 91 of the last turn of helix, and condense into the associated condenser helix, without carry-over of salt water droplets into the fresh water stream.

Vapor condenser

Details of construction of the vapor condensers appear in FIGURES 7, 8 and 12–14. The condensers 34 in chamber A, C, and E are helices having six turns, and the condensers 34 in these chambers turn in a direction opposite to that of the salt water evaporators 24. The condensers 34a in chambers B and D also have six turns, but turn in the same direction as the salt water evaporators 24. Otherwise, the construction of the condensers 34, 34a is the same. As seen in FIGURES 7 and 14, each condenser is supplied with fresh water through an inlet pipe 100, which is flanged at 101 (FIGURE 7) for connection to the associated inlet line 39a, 39b, etc., from the pump and float chamber for the section below. In the case of the last or lowermost chamber E, inlet pipe 100 for condenser 34 is connected to the cold fresh water inlet pipe 32 (FIGURES 1 and 2). The fresh water piping from pipes 39a, 39b, 39c and 39d supplied from the pump 35 of each float chamber F-ED, F-DC, F-CB and F-BA and conducted to the still chambers D, C, B and A above, have been shown diagrammatically in FIGURES 2, 4, 5 and 6, in the interest of clarity. As seen in FIGURE 14, a screen 102 is provided at each inlet pipe 100, and a smoothing baffle 104 extends above the inlet pipe so that the incoming stream of fresh water will not splatter.

Each of the condensers 34 and 34a (FIGURE 8) provide an open helical conduit, having a bottom wall 106, as best seen in FIGURE 13. The outer side wall of each conduit is formed by a cylindrical shell 108, as is also best seen in FIGURE 13. The inner wall of the helical condenser conduit is provided by an upstanding flange 110. The bottom wall 106 of each condenser conduit merges with an outlet duct 112 (FIGURES 13 and 14) which is flanged at 113, for bolting to an elbowed outlet pipe 114, see FIGURE 8. Each outlet pipe 114 connects to a float chamber F-A, F-BA, F-CB, F-DC, and F-ED, as seen in FIGURES 2–6. As previously described, a float 29, in each of the aforesaid fresh water float chambers, operates the servo-controlled valve 38 for the associated discharge pump 35. The float in chamber F-A controls the fresh water discharge valve 37a for the make-up heater 39. As mentioned, the details of these controls form no part of the invention. A suitable system of this type is marketed by the Clayton Valve Company of Newport Beach, California, as their "Cla-Val" float control system, although any of the commercially available systems of this type can be used in the practice of the invention.

The inlet and outlet connections to the condensers can be mounted in different angular positions within each chamber, to provide for staggering the various float control chambers F-A, F-BA, etc. Thus it can be seen that both the salt water and the fresh water flow down through each chamber A, B, C, D, and E, whereas externally of the chambers, the fresh water is pumped in countercurrent direction to the gravity flow of the sea water between the chambers.

As indicated in FIGURE 8, the helical construction of the condensers 34, 34a cause the stream of water within the condenser conduits to crowd to the outside of each conduit under the action of centrifugal force. This assists in preventing splattering and loss of fresh water, as well as creating a beneficial turbulence or stirring effect that assists in equalizing the temperature across each section of the condenser.

As seen in FIGURES 2 and 8, each of the float chambers has its upper portion connected by means of a pressure equilizer line 120 to the associated still chamber, in order that the pressure within each float chamber will be the same as that within the still chamber to which it is connected.

*Operational considerations*

In selecting the operating conditions, the flow rate and temperature of the salt water that is conducted into the evaporator chamber A is controlled. Similarly, the rate of flow of fresh water into the condenser chamber E is controlled, by adjustment of the proportioning control 30. Each chamber A, B, C, D, and E is hydraulically isolated from the other chambers by the water seals in the associated salt and fresh water float chambers. As previously mentioned, non-condensible or fixed gases, such as air, are removed from each chamber at the rate at which they enter either by entrainment or by leakage. The presence of appreciable quantities of fixed gases in the still chambers increases the temperature difference between the outgoing streams of water. By observing these temperatures the rate of withdrawal by pump 56 can be adjusted through valves 54. The temperature of the sea water entering each chamber is always higher than that of the fresh water entering the same chamber. The equilibrium vapor pressure in each chamber is such that the temperature of the sea water is at all times higher than the dew point temperature existing within the chamber at the equilibrium pressure. Similarly, the temperature of the fresh water in each chamber is at all times below the dew point temperature corresponding to the equilibrium pressure within the chamber. This results in evaporation of fresh water vapor from the sea water in the evaporator 24 within each chamber, and the water vapor flows over to the condenser within the chamber, because the temperature of the fresh water in the condenser is lower than the dew point temperature in the chamber. As the sea water flows downwardly through its boiler, it becomes progressively cooler, because it supplies the heat of vaporization to the vapor and hence to the fresh water. Thus the fresh water becomes progressively warmer as it flows downwardly through the associated condenser. The slight turbulence that results from the constant change in direction of sea and fresh water flow, assists in both the vaporization and the condensation processes.

The highest theoretical efficiency would be obtained if the temperature difference between the sea water and the fresh water leaving the chamber were equal to the elevation of the boiling temperature of the salt over that of the fresh water in each stage. In normal operating ranges, this temperature elevation is less than 2° C. Due to unavoidable variations in operating conditions, this temperature condition is not obtainable in practice. With boilers and condensers of practical length, the difference between the temperature of the sea water leaving each chamber, and that of the fresh water leaving the same chamber, is slightly larger than the aforesaid elevation of the salt water temperature at the equilibrium pressure in the chamber.

Thermodynamic considerations show that the highest efficiency is obtained when there is a minimum temperature gradient between the sea water and the fresh water at the upper portion of the evaporator and condenser, respectively. A reduction in this temperature gradient can be obtained by increasing the number of stages or chambers of the still. In the relatively small still being described, which has only five stages, the fresh water entering each stage may be, for example, approximately 12° C. cooler than the fresh water leaving the stage, and the salt water entering the same stage will be approximately 12° C. hotter than the salt water leaving the stage. The temperature of the fresh water leaving each stage will be approximately 2° C. lower than that of the salt water leaving the same stage. To continue the example, in the five stage system being described, hot salt water may be admitted to chamber A at 112° C., whereas fresh water may be admitted to chamber A at about 86° C., providing a maximum temperature gradient of 16° C. in the first, and in the succeeding stages. The temperature of the fresh water leaving the first stage A will be about 98° C., and that of the salt water leaving the same stage will be about 2° C. higher, or about 100° C. The average, equilibrium, or dew point temperature of the first stage will be between the aforesaid two exit temperatures of 98° C. and 100° C., or about 99° C.

Corresponding temperature conditions prevail in succeeding stages, until at the last stage the temperature of the brine leaving the last chamber E will be about 52° C., and that of the fresh water leaving the same chamber will be about 50° C. The fresh water will enter the last stage at about 38° C. Furthermore, and as mentioned, the temperature of the salt water will always be above the dew point temperature in each chamber by a little more than the boiling point elevation, and the temperature of the fresh water will always be slightly below the dew point temperature, so that distillation takes place automatically and continuously. In the sytsem described, the proportional controls of the system described will be set so that approximately 90 percent of the fresh water is recirculated, and 10 percent is drawn off as product water.

Operation of the relatively small installation being described will produce approximately 1500 gallons of product fresh water per day with a carry-over of salt water of only 12 parts per million. This rate of production is obtained by a still wherein the pressure chambers are only three feet in diameter and 27 inches high, with the salt water boiler or evaporators being 16 inches in external diameter, and with the fresh water condenser having an outer diameter of 35 inches and an inner diameter of 20 inches.

A large installation suitable for converting saline water for urban use will have as many as 30–50 stages. A typical operating range would include introduction of the hot sea water to the first stage at about 150° C., with a maximum temperature differential across one stream of each stage of about 3° to 5° C. An installation of this size would have a mode of operation identical to that of the relatively small installation described by way of example of an embodiment of the invention. However, since an appreciable portion of the heat loss is due to the difference in the temperature between the fresh water entering the last stage, and that of the brine leaving it, a reduction in the stage temperature drop (or rise) improves the thermal efficiency of the system.

As mentioned, heater 39 supplies the heat losses and the process heat.

To summarize, the term "process heat" refers to the heat that must be supplied to render the process continuous, even though the two heat exchangers 20 and 40 minimize that total heat requirements. The process heat supplied includes the chemical heat of separation of water vapor from salt water, which heat is over and above the heat of vaporization of water that is recovered in the condenser. The process heat also includes the heat that must be added to maintain the necessary temperature differences between the oil and the water in the heat exchangers 20 and 40; and the heat that must be added because of the fact that the salt water must leave each chamber of the still at a temperature higher than that at which the fresh water leaves the same chamber.

In large installations wherein each helix would be considerably longer than those previously described, a multiple lead construction could be used. This construction would insure adequate fall over the full length of each helix.

Although pumps have been shown for conducting the fresh water externally upward from the last to the first chamber, the connections could be reversed. In such a system the fresh water could flow externally from chamber to chamber by gravity, whereas the salt water would be pumped up externally from the last to the first chamber. In such a system the higher water temperatures would exist at the bottom of the still and the cooler water temperatures would occur at the top of the still. Such a system would also require that the vertical separation of the chambers be increased to compensate for the fact that chamber pressure increases as its temperature increases.

Having presented a detailed description of the invention so that those skilled in the art may practice the same, I claim:

1. Apparatus for concentrating an aqueous solution and simultaneously condensing fresh water from the solution comprising a plurality of chambers mounted one above the other, a helical conduit within each chamber for conducting the solution downwardly through each chamber, said solution conduits each having a downwardly sloping bottom wall and side walls, said solution conduit being open at the top for releasing water vapor, means for admitting the solution to the upper end of the solution conduit in the first of said chambers at a temperature above the dew point temperature in the chamber, throttled pipe means for transferring the solution from the bottom of the solution conduit in said first chamber to the upper end of the solution conduit of the next chamber, and so on to the upper end of the solution conduit of the bottom-most chamber, means for pumping out concentrated solution from the bottom of the solution of the last chamber, a helical conduit telescoped with the solution conduit in each chamber for conducting fresh water downwardly through each chamber, said fresh water conduits each having a downwardly sloping bottom wall and side walls, said fresh water conduit being open at the top for receiving water vapor, means for admitting fresh water to the upper end of the fresh water conduit in the bottom-most chamber at a temperature below the dew point temperature in the chamber, means for pumping fresh water from the bottom of the fresh water conduit of the last chamber to the upper end of the fresh water conduit of the second last chamber, and so on to the upper end of the fresh water conduit of said first chamber, and means for pumping fresh water out from the bottom of the fresh water conduit in said first chamber, said chambers each providing a substantially unobstructed path for the flow of water vapor from their solution conduit to their fresh water conduit.

2. The apparatus of claim 1, wherein said helical solution conduits are inside of said helical fresh water conduits, each solution conduit having an annular, generally horizontal baffle extending radially inwardly from its outer side wall.

3. Apparatus for concentrating an aqueous solution and simultaneously condensing fresh water from the solution, said apparatus comprising a multi-stage still system having a plurality of serially connected distillation chambers, the first distillation chamber in the series operating at the highest temperature, and the last chamber of the series operating at the lowest temperature; a continuous solution conducting conduit in each distillation chamber, said solution conduits being open at the top for releasing water vapor; a heat exchanger for heating the solution, means for passing cool solution and a hot, heat exchanger liquid through said solution heater heat exchanger for heating the solution above the dew point temperature of the first chamber; means for passing the heated solution from said solution heater heat exchanger to the solution conduit in the first distillation chamber, means for transferring the solution from the bottom of the solution conduit in said first distillation chamber to the solution conduit of the next chamber, and so on down to the solution conduit in the last distillation chamber, means for pumping out concentrated solution from the bottom of the solution conduit of the last chamber; a continuous conduit for conducting fresh water downwardly through each distillation chamber, said fresh water conduits having a downwardly sloping bottom wall and side walls, said fresh water conduits being open at the top for receiving water vapor, said distillation chambers each providing a substantial, unobstructed path for the flow of water vapor from the solution conduit to the fresh water conduit, means for pumping fresh water from the bottom of the fresh water cooler heat exchanger and through said solution the upper end of the fresh water conduit of the second last distillation chamber, and so on to the upper end of the fresh water conduit of said first chamber; a heat exchanger for cooling hot fresh water leaving the still system, means for pumping hot fresh water from the bottom of the fresh water conduit of said first distillation chamber into said fresh water cooler heat exchanger, means for passing cooled heat exchange liquid from said fresh water cooler heat exchange and through said solution heater heat exchanger for cooling the fresh water to a temperature lower than the dew point temperature in said last distillation chamber; means for returning the hot heat exchanger liquid from said fresh water cooler heat exchanger to said solution heater heat exchanger;

means for conducting cool fresh water from said fresh water cooler heat exchanger to the upper end of the fresh water conduit in the last distillation chamber, and means for bleeding off a product stream of cool fresh water from said fresh water cooler heat exchanger, which product stream represents the amount of water condensed into the fresh water conduits in said distillation chambers.

4. The apparatus of claim 3, wherein said solution is saline water, said heat exchanger liquid being immiscible with water and having a different specific gravity from that of both fresh and saline water, and means for causing the water and the heat exchanger liquid in both heat exchangers to flow counter-current and in liquid to liquid contact.

References Cited by the Examiner

UNITED STATES PATENTS

| | | |
|---|---|---|
| 585,365 | 6/1897 | Skiffington. |
| 2,447,746 | 8/1948 | Ferries et al. |
| 2,696,465 | 12/1954 | Kittredge. |
| 2,764,488 | 9/1956 | Slattery _____ 62—123 X |
| 2,821,304 | 1/1958 | Zarchin _____ 62—123 |
| 2,976,224 | 3/1961 | Gilliland. |

FOREIGN PATENTS

| | | |
|---|---|---|
| 479,954 | 3/1925 | Germany. |
| 176,499 | 3/1922 | Great Britain. |

NORMAN YUDKOFF, *Primary Examiner.*